UNITED STATES PATENT OFFICE.

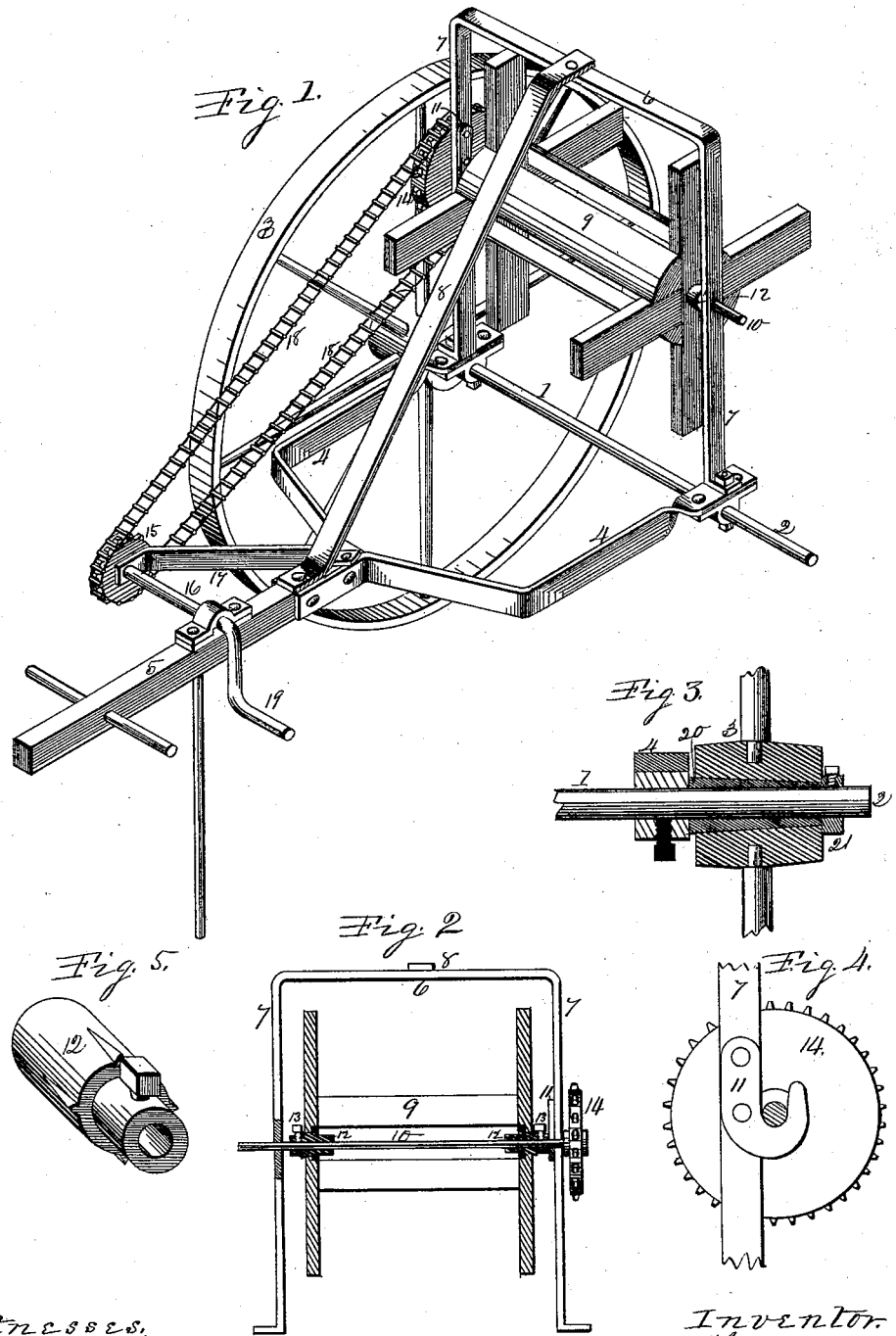

ROBERT FALCONER, OF ROCKFORD, ILLINOIS.

FENCE-WIRE CARRIAGE.

SPECIFICATION forming part of Letters Patent No. 349,576, dated September 21, 1886.

Application filed May 26, 1886. Serial No. 203,345. (No model.)

*To all whom it may concern:*

Be it known that I, ROBERT FALCONER, a citizen of the United States, residing in the town of Rockford, in the county of Winnebago and State of Illinois, have invented a Fence-Wire Carriage, of which the following is a specification.

This invention relates to wire-fence building, and its object is to facilitate the building, removing, reconstructing, and repairing of wire fences.

It consists in the improvements, hereinafter described and set forth, of a wheeled carriage on which to mount a fence-wire reel to carry and unwind the wire contained thereon in the line of the fence, and in removing the fence to wind the wire on the reel.

In the accompanying drawings, Figure 1 is an isometrical representation of an apparatus embodying my invention, in which one of the carrying-wheels is omitted. Fig. 2 is a rear elevation of portions of my wheeled wire-carriage, partly in section. Fig. 3 is a lengthwise central section of one of the carrying-wheel hubs, showing its connection with the axle-arm. Fig. 4 is a side elevation showing the connection of the shaft-support of the wire-reel with its supporting-frame, and Fig. 5 is an isometrical representation of one of the feathered bushings to the reel.

In the figures, 1 represents an axle-tree having projecting axle-arms 2, on which carrying-wheels 3 are mounted to revolve. Hounds 4 are fixed to the axle-tree at the inner end of the carrying-wheel hubs. The hounds 4, from their connection with the axle-tree, project forward and are bent inward, having their extreme forward end portions parallel, to embrace the opposite sides of the rear end of a tongue, 5, to which they are securely fixed. A rectangular frame consisting of a horizontal bar, 6, and vertical standards 7, having their foot ends fixed to the rear portions of the hounds, rise in vertical position, and constitute the reel-supporting frame. A brace, 8, fixed to the horizontal bar 6 of the reel-supporting frame and to the rear portions of the tongue, serves to give firmness to the reel-supporting frame. A wire-carrying reel, 9, of the form employed in the manufacture of barbed fence-wire, is supported on a reel-shaft, 10, mounted to revolve in bearings in the reel-supporting frame. The reel shaft 10 is supported at one end to revolve in a bearing formed in one of the vertical sides of the frame, and at its other end in a hook-bearing, 11, fixed to the other vertical side portions of the frame. The reel is fixed in position on the shaft, to revolve therewith, by means of feathered bushings 12, driven into the eye of the reel-heads, and a set-screw, 13, passed through the projecting end of the bushings to engage the shaft, serves to fix the reel to cause it to revolve with the shaft. A sprocket-wheel, 14, is fixed on one of the projecting ends of the reel-shaft. A sprocket-wheel, 15, is fixed on a crank-shaft, 16, supported to revolve in bracket-bearings 17, fixed to the tongue-frame. These sprocket-wheels 14 and 15 are connected by a chain belt, 18, and by means of the winch 19 of the crank-shaft motion may be imparted to the reel mounted on the reel-shaft. The construction of the axle-arms 2 and the connection of the axle-tree with the hounds are such as to permit the use of agricultural wheels—such as cultivator, rake, or seeder wheels—and for this purpose a wood bushing, 20, bored to receive the axle-arm, is provided, to be reduced to enter the hub of the wheel employed, into which it is driven to fix it in place. A collar, 21, with set-screw, is employed on the projecting end of the axle-arm to hold the wheel in place, and is made adjustable in its connection with the axle-arm to the varying length of the hubs of various wheels capable of use in connection with the carriage-frame.

In the use of my improved fence-wire carriage in building fence the bushings 12 are driven into the eye in each head of the reel containing the fence-wire. The reel-shaft 10 is then passed through the bushings, which are then fixed in place by means of the set-screws 13. The reel is then put in its bearing-supports in the supporting-frame and the chain belt 18 put in place on the sprocket-wheels, which fits the apparatus for use.

In building fence the free end of the wire wound upon the reel is fixed in place on a fence-post, and the carriage is then drawn on the line of the fence to be built, and its forward movement will unwind the wire and lay it in the line of the fence, to be properly stretched and fixed in place on the fence-posts.

In taking down the wires of a fence for any purpose the detached end of the wire is passed from the rear to the reel, and is fixed thereto to cause it to be wound on the reel when it is made to rotate. The attendant then by means of the winch imparts a rotary movement to the reel and winds the wire thereon, and this action will cause the carriage to move rearward on the line of the wire to be wound on the reel, and be guided in its movements by means of the tongue.

I claim as my invention—

1. In a fence-wire carriage, the main-axle hounds 4 4, bent, as described, to form a horizontal frame, and connected both to the axle and the tongue, the vertical frame mounted on said axle, a reel hung in bearings in said frame, and means for rotating said reel, substantially as described.

2. In a fence-wire carriage, the main-axle hounds 4 4, bent, as described, to form a horizontal frame, and connected both to the axle and the tongue, the vertical frame mounted on said axle, a shaft hung in bearings in said frame, means for rotating said shaft, and externally-threaded bushings adjustably secured upon said shaft and adapted to engage the eyes in the head ends of the reel, substantially as set forth.

3. The combination of the reel, reel-shaft and frame supporting said shaft and provided with closed and open bearings, the sprocket-wheel fixed on the shaft-support of the reel adjacent to the open bearing, a sprocket-wheel fixed on the crank-shaft, and a chain belt connecting the sprocket-wheels, substantially as and for the purpose set forth.

ROBERT FALCONER.

Witnesses:
JACOB BEHEL,
A. O. BEHEL.